United States Patent [19]

Rosso et al.

[11] 3,731,091

[45] May 1, 1973

[54] METHOD AND MEANS FOR MONITORING THE QUANTITY OF DISPERSED OIL IN WATER WITH MEANS FOR WIPING THE SAMPLE CELL

[75] Inventors: John B. Rosso; Robert H. Ross, Tulsa, Okla.

[73] Assignee: Combustion Engineering, Inc., Stamford, Conn.

[22] Filed: June 30, 1971

[21] Appl. No.: 158,436

[52] U.S. Cl. ........................... 250/43.5 R, 250/218
[51] Int. Cl. .................................................. G01n 21/26
[58] Field of Search ................... 250/43.5 R, 43.5 D, 250/43.5 FC, 218, 205; 356/36, 70, 201, 208; 73/421, 422, 425, 425.4

[56] References Cited

UNITED STATES PATENTS

| 3,510,648 | 5/1970 | Leger | 250/43.5 |
|---|---|---|---|
| 3,182,193 | 5/1965 | Ellner | 250/43 X |
| 3,532,434 | 10/1970 | Jones | 250/218 X |
| 3,576,558 | 4/1971 | Devries | 250/218 X |
| 3,128,786 | 4/1964 | Badgett | 250/43.5 O X |
| 3,150,261 | 9/1964 | Furbee | 250/43.5 D X |
| 3,502,412 | 3/1970 | Burns | 250/218 X |
| 3,632,211 | 1/1972 | Sedivy | 250/218 X |
| 2,405,479 | 8/1946 | Whitlock | 250/218 X |

Primary Examiner—James W. Lawrence
Assistant Examiner—D. C. Nelms
Attorney—Arthur L. Wade et al.

[57] ABSTRACT

A system is disclosed to monitor and quantify small amounts of oil dispersed in water which includes a source of ultraviolet light for transmission of light through a sample of the dispersion, a chamber for containing the sample of liquid being analyzed, a photocell for translating ultraviolet light transmitted through the sample into an electrical signal, circuit and registration means for compensating and utilizing the signal, and a reciprocating wiper for maintaining the interior walls of the sample chamber in a clean, and therefore in a suitably ultraviolet-transparent, condition.

2 Claims, 3 Drawing Figures

Patented May 1, 1973
3,731,091
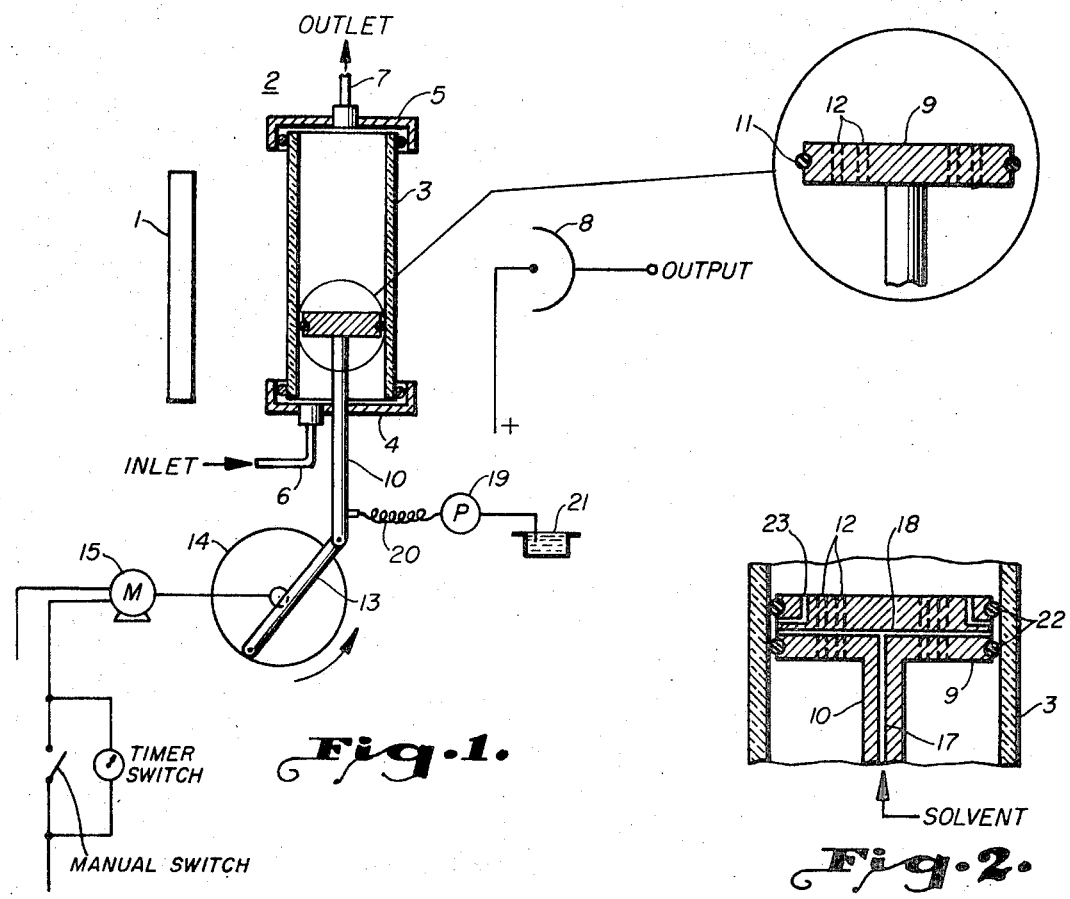
Fig. 1.
Fig. 2.
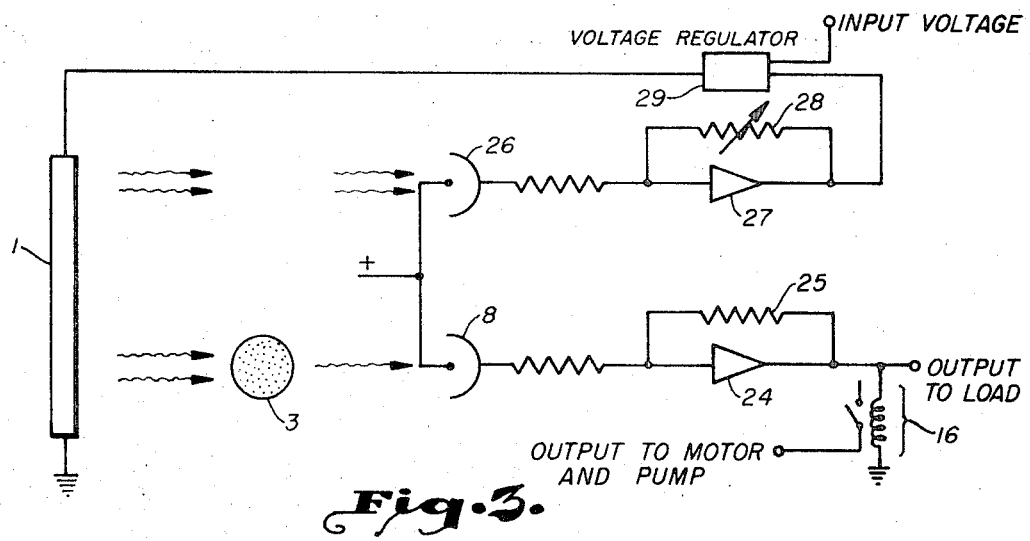
Fig. 3.
INVENTORS:
JOHN B. ROSSO
ROBERT H. ROSS
BY Arthur L Wade
ATTORNEY

METHOD AND MEANS FOR MONITORING THE QUANTITY OF DISPERSED OIL IN WATER WITH MEANS FOR WIPING THE SAMPLE CELL

BACKGROUND OF THE INVENTION

1. Field of the Invention

This invention relates to the measurement of small quantities of oil dispersed in water. More particularly, the invention relates to the determination of the quantity of dispersed oil by ultraviolet light transmitted through a sample of the dispersion to a photosensitive detector, and to the maintenance of the system utilized in the determination.

2. Description of the Prior Art

It is known to expose in various ways oil-in-water dispersions to ultraviolet light, and to register the results thereof at photosensitive detector cells whose outputs are applied to various manifestation and control devices. Ultraviolet light has been used to cause fluorescence of the oil, to measure reflection-refraction indices of the dispersion, and to measure the transmissibility of the dispersion. For example, see patents to Hach, U.S. Pat. Nos. 3,564,262, and to Stock, et al., G.B. 1,227,551; and systems of Bull & Roberts, Inc., Murray Hill, N. J., described in their brochure titled "Aqualert, Model 130," and of Teledyne Industries, Inc., San Gabriel, California, described in specification sheet titled "Series 600 Photometric Analyzer."

A strong tendency exists for residues from the oil-in-water dispersion to adhere to the internals of such systems. An accumulation of these residues in a system which operates in a manner similar to the system disclosed introduces unacceptable error into the measurement function. To prevent such error, it is required to remove the residue accumulation, and necessarily to interrupt measurements. This maintenance requirement has previously caused interruptions which were so frequent and of such significant time duration as to upset the continuity of the measurements and render the system less than wholly effective in monitoring the quantity of oil in the dispersion. For example, in a prior art system which also records ultraviolet light transmitted through the dispersion, when the buildup of oil residues on the walls of the sample container present a falsely low quantity of light to the photocell (and thus a falsely high indication of the quantity of oil in the dispersion), measurement must be discontinued, and the sample container section of the system dismantled for removal of the residues.

It has therefore long been a problem to provide the necessary maintenance of a system such as the one disclosed in a manner which would allow accurate, substantially continuous operation. The present invention solves this maintenance problem in a novel and highly efficient way, and thus provides a system capable of essentially continuous error-free measurement.

SUMMARY OF THE INVENTION

Accordingly, the principal object of the invention is to provide an improved system and method for the quantification of small amounts of oil dispersed in water. The attainment of this object includes utilizing for a manifestation and/or control function the electrical output of a photocell which is in direct proportion to the transmissibility of ultraviolet light through an oil-in-water dispersion, and maintaining the continuous and accurate quantitative measurements of the oil in said dispersion by insuring the appropriate part of the system remains suitably free of residues from the dispersion.

The invention contemplates therefore a system and method to quantitatively determine the small amounts of oil in an oil-in-water dispersion, and includes a source of ultraviolet light, a container for the sample of the dispersion being analyzed, a photosensitive detector cell for producing a voltage output in direct response to the amount of ultraviolet light transmitted through the sample, suitable circuitry to provide for the utilization of the cell output to operate control and/or manifestation means, and a wiper means preferably in the form of a reciprocating piston to clean the sample container upon the occurrence of predetermined conditions in the container which require that the wiper means be actuated. Refinements of the embodiment of the basic concept contemplate conduits within the piston for introduction of oil solvent to the walls of the container to enhance the removal of oil residues therefrom; and circuit means to stabilize the output of light by the ultraviolet source.

Other objects, advantages and features of this invention will become apparent to one skilled in the art upon consideration of the written specification, appended claims, and attached drawings, wherein;

FIG. 1 is a diagrammatic representation of the elements of the system for determining a small quantity of oil dispersed in water in which the present invention is embodied, with an enlargement for better detailing of the wiper piston;

FIG. 2 is a representation of the wiper piston in which conduits are provided for introducing oil solvent to the walls of the sample container during reciprocation of the piston to enhance the cleaning action thereof; and FIG. 3 is a diagram of a circuit for stabilizing the output of light by the ultraviolet light source.

DESCRIPTION OF THE PREFERRED EMBODIMENT

FIG. 1 depicts a system for quantifying the small amounts of oil present in an oil-in-water dispersion. The oil present in the dispersion is contemplated to range between about 10 and 150 ppm. It is recognized that when more than about 150 ppm of oil are consistently present, systems using other physical principles, such as the system disclosed in U.S. Pat. No. 3,385,108, are preferred.

In FIG. 1, an ultraviolet light source 1 is arranged to emit light through a sample container structure denoted generally by the numeral 2. In the embodiment, the container 2 is formed of a quartz cylinder 3 sealed at either of its ends in standard fashion by caps 4, 5 and O-ring seals. The sample of the oil-in-water dispersion to be analyzed for the quantity of oil enters through a suitable inlet conduit 6 and exits following exposure to light 1 through outlet 7. It is contemplated in the preferred form of the invention that samples will move continuously through cylinder 3, rather than possess a discrete residence time therewithin. For example, if a discharge stream of oil and water were desired to be monitored, a side stream would be diverted through the container structure 2 so that continuous indications of the oil content of the side stream and the discharge stream would be had.

The ultraviolet light transmitted through the sample is received at a photosensitive detector 8, or photocell, and is translated into a voltage proportional to the light so transmitted. Specifically, the greater the quantity of oil in the sample of the dispersion present in cylinder 3, the more light of the light source 1 is absorbed by the sample, and the less the output of cell 8; and vice versa, when less oil is present in the sample of the dispersion.

The wiper apparatus for maintaining the condition of the wall of cylinder 3 free of oil residue which will form thereon is characterized in the preferred embodiment by piston 9 and connecting rod 10. A ring, such as an O-ring 11, is disposed about the piston to facilitate the wiping action. Holes 12 are formed through piston 9 so that fluids present in the sample container 2 can bypass the piston when it is as shown, or when it is moved axially through the cylinder 3 of structure 2. The action of the piston and O-ring structure is to bear upon said walls to scrape or strip the residue therefrom.

In the preferred form, the piston is actuated in a well known manner, as by eccentric mounting of a linking rod 13 connected to a drive wheel 14 and the rod 10, or as by engagement with a driven cam surface (not shown). Actuation is performed by the motor 15 shown schematically in FIG. 1 rotating wheel 14 to reciprocate the piston. Actuation is effected upon the occurrence of one or more operating conditions. For example, if the voltage output of cell 8 drops below a specified value, the wheel 14 or cam connected to rod 10 shall be automatically rotated to reciprocate the piston. In FIG. 3, a normally closed relay device 16 is shown in performance of this function; when the load output drops below the preselected value, relay 16 closes to reciprocate the piston. It is apparent that the condition to cause actuation may also be, alternatively or in addition, such as upon the discretion of a human operator, or upon the passage of selected time intervals. It is also apparent that a meter relay, i.e., a combination indicator and relay device with a set point function, could be used to perform the relay 16 function.

In FIG. 2, the piston is shown in an embodiment to permit the introduction of oil solvent through conduits 17,18 formed in the rod and piston. The signal which actuates the piston is also applied at a pump means 19 shown schematically in FIG. 1 connected to the conduits by a flexible hose 20, so that solvent from a reservoir 21 is introduced at the walls of quartz cylinder 3 to facilitate the cleaning action of alternative O-rings structure 22. Relief ports 23 are provided for the flow of spent solvent.

A circuit for compensating for the inherent variability of intensity of the ultraviolet light source is disclosed in FIG. 3. Cylinder 3 containing a sample for analysis transmits ultraviolet light to cell 8 which produces a voltage proportional to the oil quantity therein, in the previously described manner. Amplifier 24-resistance 25 fix the gain for utilization in a device for manifestation of the oil quantity of the sample, and/or for utilization of the voltage in a desired control function such as to operate a valve to shut off the flow of the discharge stream being monitored. In addition, a second photocell 26 produces a voltage proportional to the total instantaneous light intensity of the source 1. Gain is set through amplifier 27 and variable resistance 28 (made variable for ranging). The signal is then applied to a voltage regulator device 29 to produce a voltage to modify the voltage applied across light source 1, for example, to increase the voltage when the output of source 1 decreases. The light output of source 1 is thus stabilized to produce a light of substantially constant intensity.

The concept of the invention is thus seen to measure a small quantity of oil present in a dispersion of oil in water, and to maintain the measurement continuous and accurate by a novel method and means which effect the removal of oil residues from the sample container upon the occurrence of selected predetermined conditions which bring about the actuation of the removal mechanism.

From the foregoing, it will be seen that this invention is one well adapted to attain all of the ends and objects hereinabove set forth, together with other advantages which are obvious and inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A method of detecting and quantifying small amounts of oil dispersed in water when said amounts range from approximately 10 to 150 ppm, including, transmitting ultraviolet light through a sample of the dispersed oil and water contained within a chamber of fixed predetermined dimensions, detecting the amount of such light transmitted through the sample by first photosensitive detector means which generate an electrical signal proportional thereto, removing residues of the dispersion from the interior of the sample container by reciprocating wiper means upon the occurrence of a condition which requires the actuation of the wiper means, and introducing an oil solvent fluid adjacent to the interior surface of the sample chamber via the wiper means to enhance the cleaning function of the wiper means.

2. A system for detection and quantification of small amounts of oil dispersed in water when said amounts range from 10 to 150 ppm, including, a source of ultraviolet light arranged to be projected through an oil and water dispersion, a container within which a sample of oil dispersed in water is contained, said container being formed of a material substantially transparent to the ultraviolet light of the source and arranged proximate to said source of exposure to its light, a first photosensitive detector arranged to measure the amount of the light of the source transmitted through the sample of the oil-in-water dispersion, circuit means connected to the detector to manifest the voltage output thereof, piston means arranged within the sample chamber to remove the oil residues of the dispersion from the interior walls thereof by contact between the piston and walls during reciprocation of the piston, a first conduit arranged transversely through the body of the piston to carry an oil solvent into contact with the interior walls of the sample chamber during the reciprocation of the piston, a second conduit arranged axially through a connecting rod of the piston and connected at one end with the first conduit, and at the other end with a source of the oil solvent, and pump means for urging the solvent through said conduits.

* * * * *